(12) United States Patent
Martin et al.

(10) Patent No.: US 6,187,205 B1
(45) Date of Patent: Feb. 13, 2001

(54) DECONTAMINATION OF A PHOTOGRAPHIC EFFLUENT BY TREATMENT WITH A FIBROUS POLYMERIC ALUMINO-SILICATE

(75) Inventors: Didier J. Martin, Givry; Oliver J. Poncelet; Jeannine Rigola, both of Chalon sur Saone, all of (FR)

(73) Assignee: Eastman Kodak Company, Rochester, NY (US)

(*) Notice: Under 35 U.S.C. 154(b), the term of this patent shall be extended for 0 days.

(21) Appl. No.: 09/092,211

(22) Filed: Jun. 5, 1998

(30) Foreign Application Priority Data

Jun. 5, 1997 (FR) .................................................. 97 07202

(51) Int. Cl.⁷ ............................................ B01D 15/04
(52) U.S. Cl. ...................... 210/668; 210/679; 210/683; 210/688
(58) Field of Search ................................ 210/668, 679, 210/683, 688, 763; 430/398

(56) References Cited

U.S. PATENT DOCUMENTS

| 3,988,259 | 10/1976 | Ray ....................................... 252/416 |
| 4,663,439 | 5/1987 | Gradeff et al. ........................... 534/15 |
| 4,741,833 | 5/1988 | Sheikh .................................. 210/665 |
| 5,534,148 | * 7/1996 | Suzuki et al. ......................... 210/631 |
| 5,683,826 | * 11/1997 | Poncelet et al. ...................... 430/490 |

FOREIGN PATENT DOCUMENTS 0 186 169    7/1986    (EP).
0 691 308    10/1996   (EP).

* cited by examiner

Primary Examiner—Ivars Cintins

(57) ABSTRACT

The invention concerns a method of decontaminating a photographic effluent. The method comprises contacting the effluent with a fibrous polymeric alumino-silicate and, optionally, with a cerium-based catalyst on an activated carbon membrane. The iron, silver, thiosulphate and organics contents of photographic effluents are reduced.

10 Claims, 2 Drawing Sheets

DECONTAMINATION OF A PHOTOGRAPHIC EFFLUENT BY TREATMENT WITH A FIBROUS POLYMERIC ALUMINO-SILICATE

The present invention concerns the purification of used (or seasoned) photographic processing solutions, with a view to the recycling of these solutions or discharging them to the drains.

A photographic processing generally comprises a final step which is a passage through a washing and/or stabilization bath. The accumulation, in the washing and/or stabilization baths, of substances coming from the prior processing steps is particularly prejudicial not only to the stability of the photographic images developed to the correct maintenance of the sensitometric characteristics, but also to the possibility of recycling these washing and stabilisation baths or discharging them to the drains. After some time of use, the washing and stabilisation baths contain inorganic compounds, such as iron, silver, thiosulfate, sulfate and sulfite ions or organic compounds which are either substances used for development, fixing, or bleach fixing, or products coming from the development, or from the various processing steps. All these products contribute to raising the COD of the solution.

The problem represented by the high COD of the used photographic processing solutions is particularly critical in the case of "minilab" processing. Various techniques have been recommended for resolving this problem with a view either to recycling the solutions with the possible addition of fresh solution, without any harm to the photographic processing, or discharging to the drains without harm to the environment.

It has been for example proposed to subject the effluent to electrolytic oxidation, dialysis, reverse osmosis as described in German patent application 3 246 897, flocculation, oxidation with ozone or oxygenated water, optionally coupled with UV treatment, as described in U.S. Pat. 5,439,599 of Géhin et al. It has been also proposed to combine non-catalytic oxidation with catalytic oxidation and biological treatment, as described in European patent application 690 025.

The treatments described in the literature usually recommend the combination of two or more techniques in order to obtain satisfactory decontamination of the effluent, enabling it to be discharged, or to eliminate contaminants which would be detrimental to re-use of the effluent. Some of these techniques have a high application cost.

The object of the present invention is a method for decontaminating a photographic effluent, which is seasoned (used) photographic processing solution having a high COD, in a simple and economical fashion.

SUMMARY OF THE INVENTION

The method of the invention comprises the step of bringing the photographic effluent into contact with a fibrous polymeric alumino-silicate having an Al:Si molar ratio of between 1 and 3 under conditions and for a period such that a reduction in the iron, silver and thiosulphate content of this effluent is achieved.

Figure 1:
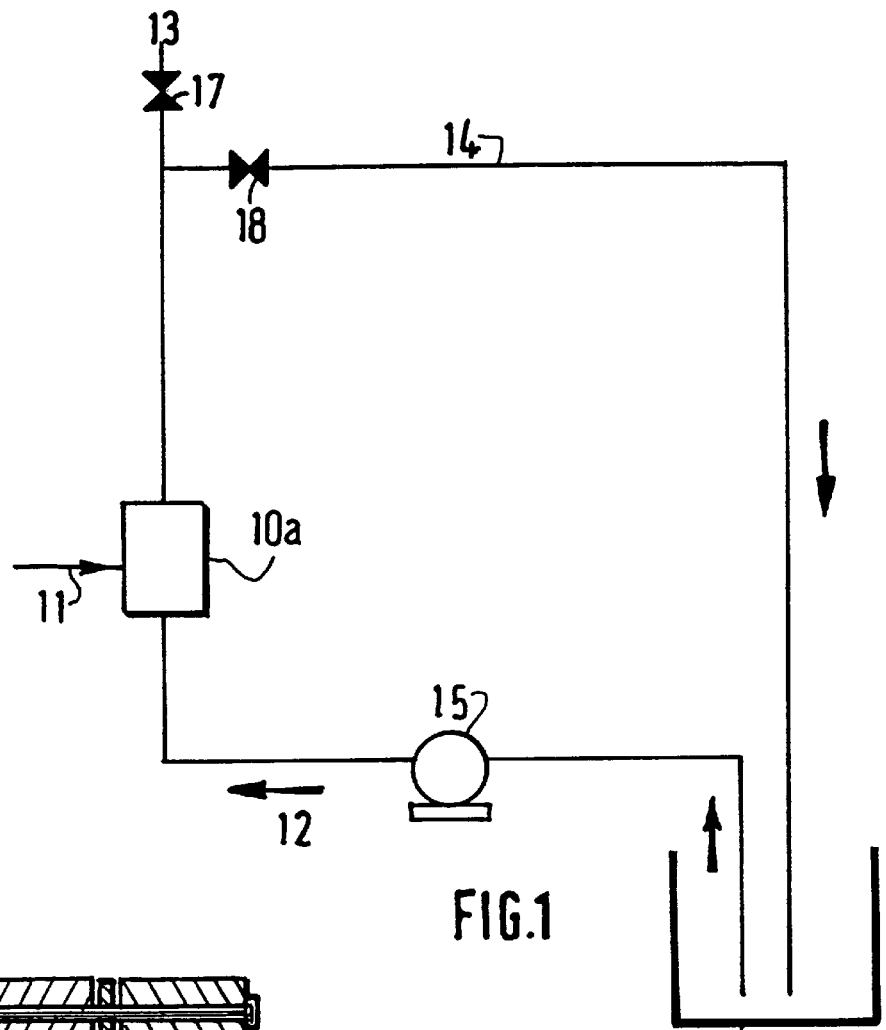
FIG. 1 shows a method of treating a photographic effluent for comparison to the present invention according to Example 4 below.

For a better understanding of the present invention, together with other advantages and capabilities thereof, reference is made to the following detailed description and claims in connection with the above described drawings.

DETAILED DESCRIPTION OF THE INVENTION

In the present description and claims:

the terms "photographic effluent" designate a used (or "seasoned") photographic processing solution, preferably the content of a washing bath or stabilisation bath, for example a Kodak RA-4 stabiliser for processing Ektacolor paper, or a C-41 stabiliser used processing Flexicolor products, the COD of these effluents lies between 5 and 30 g/l, and preferably between 10 and 20 g/l, measured in accordance with AFNOR NF T90-101.

The polymeric alumino-silicate employed according to the invention is described in European patent application No 0741668 (International application WO 96/13459). This polymeric alumino-silicate is obtained as follows:

(a) a mixed alkoxide of silicon and aluminium is treated with an aqueous alkali, at a pH between 4 and 6.5; the aluminium concentration is kept between $5 \times 10^{-4}$ and $10^{-2}$ M and the Al:Si ratio between 1 and 3;

(b) the mixture obtained at (a) is heated to a temperature of between 95 and 98° C. in the presence of silanol groups for a sufficient period to obtain a complete reaction;

(c) the residual ions are eliminated from the reaction medium.

The material obtained has a formula $Al_xSi_yO_z$ where x:y is between 1 and 3 and z is between 1 and 10.

According to an embodiment, step (a) can comprise the steps of adding a silicon alkoxide to an aluminium salt, and then treating the mixture with an aqueous alkali.

The polymer resulting from step (c) is in solution; it can be isolated from its solution by gelation and centrifugation.

The treatment of the photographic effluent with the polymeric alumino-silicate can be effected in various ways. It is for example possible to add this alumino-silicate to the effluent in solid form or in the form of a solution. It is also possible to pass the effluent through a cartridge lined with this alumino-silicate, either in bulk, or in the form of a deposition on a membrane support. When the alumino-silicate is added directly to the effluent, the desirable quantity represents from 0.1 g to 10 g and advantageously, from 0.5 g to 5.0 g per liter of effluent treated. When a cartridge lined with this alumino-silicate is used, in which the effluent is circulated, it is necessary to provide between 1 and 10 g of alumino-silicate per liter of effluent treated.

A treatment according to the invention can be combined with other decontamination treatments.

It is for example possible to associate the treatment of the invention with an oxydation treatment with oxygenated water and/or an oxidising derivative of cerium.

This cerium derivative can be prepared as follows:

(1) a porous support is impregnated with a cerium derivative, having an FT Raman spectrum having a first peak between 410 and 430 cm$^{-1}$ and a second peak between 530 and 560 cm$^{-1}$, and (2) the porous support impregnated at (1) is hydrolyzed and dried so as to form an oxidation catalyst immobilized on the porous support.

A method of preparing the cerium derivative having these characteristics was described by L M Brown and K S Mazdiyasni in Inorg. Chem. 1970, 9, 2783. The method consists of reacting the cerium with an alcohol, in an appropriate stoechiometry, optionally in the presence of a catalyst, and then performing a controlled hydrolysis. During this hydrolysis, the reaction medium becomes viscous and until a gel is formed, which allows recovery of the product. This technique is referred-to in the literature as a "sol-gel" technique. It can therefore be assumed, though this is not certain, that the cerium derivative obtained is of the alkoxyd type. An operating method is given in the following examples. As the alcohol, it is possible to use an aliphatic alcohol with a straight or branched alkyl chain, optionally substituted, preferably C1–C5, such as methanol, ethanol, propanol, isopropanol, 1-butanol, 2-butanol, or polyols, such as 1,3-butanediol.

The cerium derivative is then immobilized on the support. Any application or impregnation technique can be used for this purpose. A usual technique consists of impregnating the support with a solution of the cerium derivative and leaving the impregnated support exposed to ambient atmosphere. Hydrolysis takes place in situ. The quantity of catalyst is between 0.01 mg/cm$^2$ and 10 mg/cm$^2$ and preferably between 0.1 and 5 mg/cm$^2$.

The support for the catalyst serves as a porous absorbent membrane for filtering and decontaminating the photographic effluent. It is possible to use materials based on activated carbon, such as ACTITEX membranes, or materials such as ceramics, alumina, silica or silica derivatives.

The method according to the invention makes it possible to decontaminate the photographic effluent by reducing its COD and in particular decreasing its content of substances such as iron, silver, thiosulfate and organics such as hydroquinone and hydroquinone derivatives, phenidone and derivatives thereof, hetrocyclic compounds, used for example as anti-foggants, surfactants, for example with oxidizable unsaturations. The treatment of the seasoned effluent is performed at a temperature of between 15 and 60° C. and preferably at room temperature. It is not necessary to effect a prior dilution of the treated effluent. The treatment can be effected at atmospheric pressure, that is to say without the application of pressure or a negative pressure, unlike ultrafiltration, nanofiltration or reverse osmosis treatments. However, if desired, the treatment can be carried out under pressure.

Figure 4:
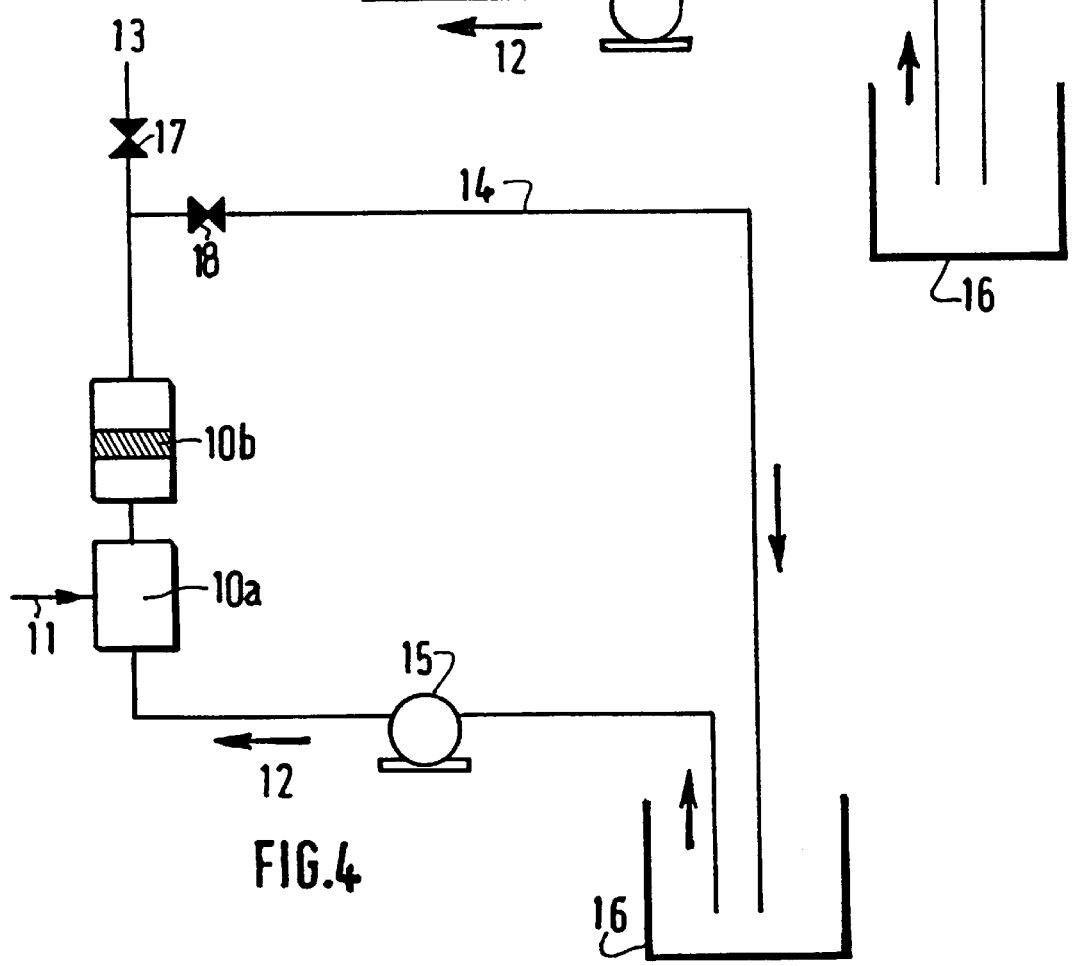
FIG. 4 depicts schematically equipment for performing the method according to the present invention for treating a photographic effluent.

FIG. 4 depicts schematically an equipment for performing the method according to the invention. A reactor 10a comprises one or more membranes with a carbon support impregnated with the cerium-based catalyst described above. Inside the reactor, the membrane or membranes can be disposed in any suitable fashion, including wound up in spirals. The pipe 11 is an air feed which is used for oxidation. The pipe 12 is the inlet for the effluent to be treated, coming from a reserve 16, and the pipe 13 the outlet for this effluent after treatment. The installation also comprises a cartridge 10b lined with the fibrous polymeric alumino-silicate described above, a recirculation loop 14, valves 17–18 and a pump 15. According to a variant, it is possible to pass the effluent first of all through the cartridge lined with alumino-silicate, and then into the oxidation reactor.

The following examples illustrate the invention.

EXAMPLE 1

Preparation of alumino-silicate

At 16.7 mmoles of tetraethylorthosilicate Si(OR)$_4$ was added to 1000 ml of deionized water. The reaction mixture was stirred at room temperature for one hour and then this solution was added to 31.2 mmoles of AlCl$_3$, 6H2O in solution in 1000 ml of pure water. The mixture was stirred for 20 minutes and then the pH was adjusted to 6.8 with NaOH 1M. A white gel was obtained which was centrifuged for 20 minutes at 2000 rpm. This gel was collected and redissolved with 5 ml of a 50:50 mixture of HCl 1M and acetic acid 2M. The volume was made up to 2 l with water. The solution contained 30 mmoles Al, 16.6 mmoles Si, 5 mmoles HCl and 10 mmoles of acetic acid. This solution was stored at 5° C. whilst awaiting its use. This solution was diluted with deionized water in order to obtain an Al concentration of 10 mmoles/l. This dilute solution was heated for 5 days at 96° C. and was then filtered through an ultrafiltration membrane having a separating capacity of 10,000 Daltons (membrane manufactured by AMICON). A clear solution was obtained containing Al and Si in an Al:Si ratio of 1.8.

EXAMPLE 2

Preparation of Catalyst 14.01 g of metallic cerium in slivers (0.1 mole) was mixed with 100 ml of anhydrous toluene. 100 ml of freshly distilled 2-methoxyethanol was added, and then 10 mg of HgCl$_2$. The mixture was heated to reflux whilst stirring vigorously for 2 hours. The mixture was filtered and the filtrate was recovered and concentrated. The product (1a) was purified by crystallisation in a mixture of toluene and methylene chloride. A solution (1b) of 1 g of the product (1a) in 50 ml of absolute ethanol was prepared; this solution was stored in an argon atmosphere.

A porous membrane of Actitex CS 1301 activated carbon porous membrane was used as a catalyst support. This membrane had a specific surface area of 1300 m$^2$/g. This membrane was immersed in 15 ml of solution (1b) for 15 minutes whilst keeping in an argon atmosphere and with ultrasonic agitation and at room temperature. The membrane thus impregnated was then dried for 1 hour in ambient air and at room temperature. After drying, the membrane was washed by immersing it in water for 15 minutes, with ultrasonic agitation. The membrane was then dried at room temperature for 10 hours.

EXAMPLE 3

13.7 g of barium in granule form (0.1 mole) was mixed with 100 ml of freshly distilled 2-methoxyethanol. A highly exothermic reaction resulted. After 2 hours, the mixture was filtered and the colourless filtrate was evaporated until dry. The product was recrystallised in a mixture of hexane and THF. 27.3 g of product (2a) is obtained (yield 95%). solution 2b of 1 g of product 2a in 50 ml of absolute ethanol was prepared. A sample of Actitex CS 1501 membrane, identical to that of Example 1, was immersed in a mixture consisting of 15 ml of solution 1b and 15 ml of solution (2b) for 15 minutes whilst keeping it in an argon atmosphere and with ultrasonic agitation. The membrane impregnated as in Example 1 was then dried and washed.

EXAMPLE 4

COMPARATIVE

Figure 2:
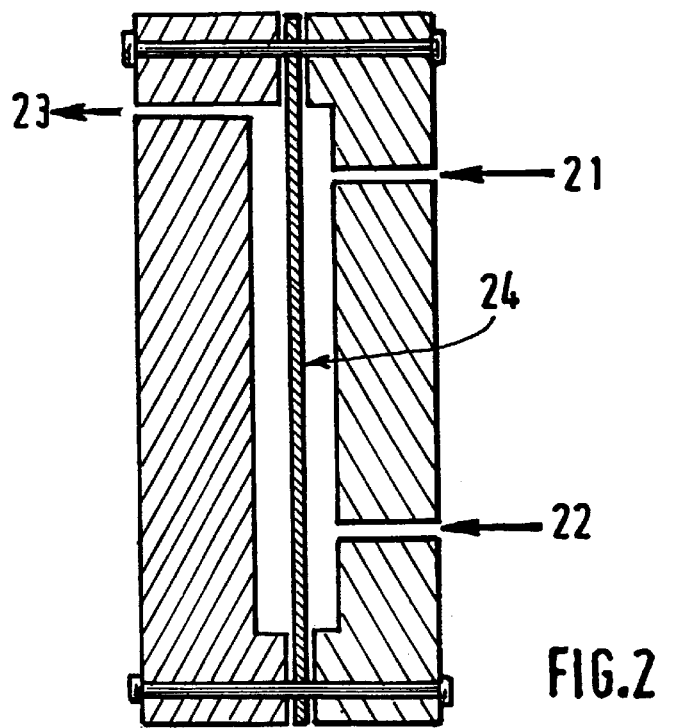
FIG. 2 shows a section view of a reactor used in the process of FIG. 1.

Samples of 250 ml of Kodak RA-4 stabiliser, used in processing on Ektacolor paper, were treated by passing them through an equipment as schematically depicted in FIG. 1. The equipment comprised a reactor 10a in accordance with the section view of FIG. 2. This reactor comprised two plastic half-shells pressed against each other and between which a membrane 24 was disposed with a space allowing the circulation of effluent (pipes 22–23). The pipe 21 served as an air inlet. The membrane surface area offered to the reaction was 32 cm². The membrane 24 was an Actitex activated carbon membrane. A pump provided a flow of 25 ml/minute.

The thiosulfate concentrations of the effluent were determined as a function of the duration of the catalytic oxidation treatment in the reactor. The effectiveness of the treatment was measured by the reduction in the thiosulfate concentrations, expressed as a percentage with respect to the content before treatment. The stabilizer initially contained 1.5 g/l of iron in the form of EDTA complex, 900 ppm of silver in the form of silver thiosulfate and 7.0 g/l of thiosulphate. The results are given in Table 1 below.

EXAMPLE 5

Figure 3:
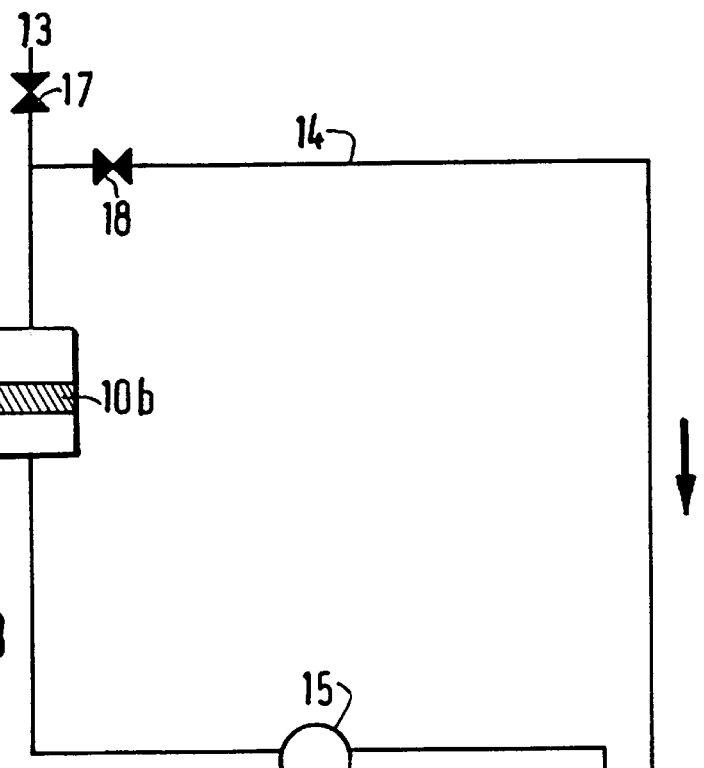
FIG. 3 shows equipment for performing the method according to the present invention for treating a photographic effluent in which the reactor of FIG. 1 was replaced by a filtration cartridge according to Example 5 below.

The operating method of Example 4 was repeated, but the reactor 10a was replaced with a filtration cartridge 10b (FIG. 3) prepared as follows.

A borosilicate sinter with a porosity of 3 was used as a support. This sinter was washed with ethanol in ultrasound for 15 minutes and was then dried in an oven at 100° C. for 1 hour. The sinter was immersed in an alumino-silicate solution prepared as in Example 1, with the addition of an aqueous solution of gelatin with 50% of gelatin by weight with respect to Al+Si. The surface of the sinter was dried and the sinter was disposed in the cartridge 10b.

The results obtained are set out in Table 1.

EXAMPLE 6

The operating method of Example 4 is repeated, but 100 g per liter of the alumino-silicate solution prepared in Example 1 was added to the Kodak PA-4 stabilizer.

EXAMPLE 7

The operating method of Example 4 was repeated, modified as follows (FIG. 4):

(1) an activated carbon membrane impregnated with catalyst in accordance with the operating method of Example 3 was used in the reactor 10a;

(2) a cartridge 10b was added which was equipped with a 1.2 μm filter; and filled with 100 g of an alumino-silicate solution prepared as in Example 1.

The results obtained are set out in Table 1.

TABLE 1

| | Reduction in content as % | | |
|---|---|---|---|
| | Fe | Ag | $S_2O_3$ |
| Reactor with Actitex membrane (Example 4) | 0 | 2 | 5 |
| Alumino-silicate in the cartridge (Example 5) | 0 | 32 | 7 |
| Reactor with Actitex membrane; alumino-silicate added to the effluent (Example 6) | 14 | 25 | 16 |
| Alumino-silicate in the cartridge Reactor with Actitex membrane impregnated with cerium/barium catalyst (Example 7) | 33 | 46 | 42 |

What is claimed is:

1. Method for treating a photographic effluent to decontaminate it for discharge or reuse, comprising the step of contacting this effluent with a material consisting essentially of fibrous polymeric alumino-silicate having the formula AlxSiyOz where z is between 1 and 10 and x:y is between 1 and 3.

2. The method of claim 1, wherein the fibrous polymeric alumino-silicate is added directly to the effluent.

3. The method of claim 1, wherein the effluent is passed through a cartridge lined with the fibrous polymeric alumino-silicate.

4. The method of claim 1, wherein the photographic effluent (i) comes continuously from a photographic processing bath, (ii) passes through a loop comprising a cartridge containing the fibrous polymeric alumino-silicate, and (iii), at the outlet from the cartridge, is recycled in the photographic processing bath.

5. The method of claim 4, wherein the photographic effluent comes from a stabilization bath of a colour process.

6. The method of claim 1, wherein the effluent is also subjected to a catalytic oxidation, performed by means of a catalyst which is obtained by a process comprising the steps of:

(1) impregnating a porous support with a cerium derivative, having an FT Raman spectrum exhibiting a first peak between 410 and 430 cm$^{-1}$ and a second peak between 530 and 560 cm$^{-1}$, and (2) the porous support impregnated at (1) is hydrolyzed and dried so as to form an oxidation catalyst immobilized on the support.

7. The method of claim 6, wherein the porous support is an activated carbon membrane.

8. The method of claim 6, wherein the catalyst comprises, in addition to the cerium derivative, a derivative of an alkaline-earth metal.

9. Method for treating a photographic effluent to decontaminate it for discharge or reuse, comprising the step of contacting this effluent with a material consisting essentially of an aqueous solution of a fibrous polymeric aluminosilicate having the fonnula $Al_xSi_yO_z$ wherein z is between 1 and 10 and x:y is between 1 and 3.

10. Method for treating a photographic effluent to decontaminate it for discharge or reuse, comprising the step of passing this effluent through a cartridge lined with a material consisting essentially of a fibrous polymeric aluminosilicate having the formula $Al_xSi_yO_z$ wherein z is between 1 and 10 and x:y is between 1 and 3, said fibrous polymeric aluminosilicate being deposited on a porous support.

* * * * *